US006483780B2

(12) United States Patent
Gzybowski et al.

(10) Patent No.: US 6,483,780 B2
(45) Date of Patent: Nov. 19, 2002

(54) SECURITY SYSTEM USING MODULAR TIMERS

(76) Inventors: Michael S. Gzybowski, P.O. Box 13381, Fort Wayne, IN (US) 46868; Robert G. Lev, 4766 Michigan Blvd., Youngstown, OH (US) 44505

( * ) Notice: Subject to any disclaimer, the term of this patent is extended or adjusted under 35 U.S.C. 154(b) by 0 days.

(21) Appl. No.: 10/033,497

(22) Filed: Oct. 19, 2001

(65) Prior Publication Data

US 2002/0101786 A1 Aug. 1, 2002

Related U.S. Application Data

(63) Continuation of application No. 09/536,654, filed on Mar. 27, 2000, now Pat. No. 6,307,812.

(51) Int. Cl.[7] .......................... G04B 47/00; G04F 8/00; G04F 10/00; G01H 43/00

(52) U.S. Cl. ......................... 368/10; 368/107; 307/141; 307/141.4

(58) Field of Search ............................. 368/9, 10, 107; 307/14, 141.4; 340/309.15, 309.4

(56) References Cited

U.S. PATENT DOCUMENTS

| | | | | | |
|---|---|---|---|---|---|
| 4,367,416 | A | * | 1/1983 | Von Gunten | 307/132 R |
| 4,535,466 | A | * | 8/1985 | Palvolgyi | 377/54 |
| 5,258,656 | A | * | 11/1993 | Pawlick | 307/141 |

* cited by examiner

*Primary Examiner*—Vit Miska
(74) *Attorney, Agent, or Firm*—Michael S. Gzybowski

(57) ABSTRACT

Electrical timer modules that interact with one another so as to effect random operation of a plurality of electrical devices, creating the appearance that the devices are not operated automatically. The timer modules include circuitry that allows them to wake up from a sleep state or mode within a random time interval. Upon waking from the sleep state or mode, each modular timer initially senses for the presence of a transmitted signal. Upon receipt of a transmitted signal each module returns to its sleep state or mode. If no transmitted signal is received, the first timer module that wakes up transmits a signal to the other modules and activates an electrical device connected thereto.

10 Claims, 2 Drawing Sheets

SECURITY SYSTEM USING MODULAR TIMERS

RELATED APPLICATIONS

This is a continuation of continued prosecution application Ser. No. 09/536,654 filed Mar. 27, 2000, now U.S. Pat. No. 6,307,812.

TECHNICAL FIELD

The present invention relates to electrical timers that are used to activate and/or deactivate electrical devices such as lights. More particularly, the present invention relates to modular electrical timers which interact with one another so as to effect random operation of a plurality of electrical devices, creating the appearance that the devices are not operated automatically.

BACKGROUND ART

There presently exists numerous electrical timers which can be plugged into a standard outlet or receptacle and used to control electrical devices such as lights. Such timers are commonly used to turn lights on and off in homes and businesses when no one is on the premises. For example, when people go away on vacation, they often use electrical timers to turn lights in their homes on and off so that it will appear as if someone is home.

One of the problems associated with timers which are used to date is that the timers turn the same lights or other electrical devices on and off at the same time or nearly the same time every night. There are timers which activate lights or other devices on and off at random times. However, such random times are typically within a small preset interval of a selected time setting. For example, there are conventional electrical timers which can be set so that they activate or deactivate electrical devices randomly within a preset interval, e.g. within 15–20 minutes of a preset time. This random operation is suppose to avoid repetitive operation which can be an indication that the controlled electrical devices are in fact controlled by a timer, rather than a present human operator.

Even when using timers which have random intervals of operation, the same electrical devices, e.g. electrical lights, are turned on. Thus, it is not possible to actually operate electrical devices such as electrical lights in a random manner using existing electrical timers.

The present invention provides electrical timers which interact with one another in such a manner to effect random operation of a plurality of electrical devices such as electrical lights.

SUMMARY OF THE INVENTION

According to other features, characteristics, embodiments and alternatives of the present invention which will become apparent as the description thereof proceeds below, the present invention provides an electrical activation/timing system having a wide variety of operating parameters.

The present invention further provides a timing system by which a wide variety of electrical devices arranged at different locations can be selectively activate on a seemingly random basis.

The present invention further provides a full programmable activation system for electrical devices using a plurality of separate, independent activation devices.

The present invention also provides electrical timers which interact with one another in such a manner to effect random operation of a plurality of electrical devices such as electrical lights.

BRIEF DESCRIPTION OF DRAWINGS

Features and characteristics of the present invention will be described hereafter with reference to the attached drawing which is provided as a non-limiting example only in which.

BEST MODE FOR CARRYING OUT THE INVENTION

Figure 1:
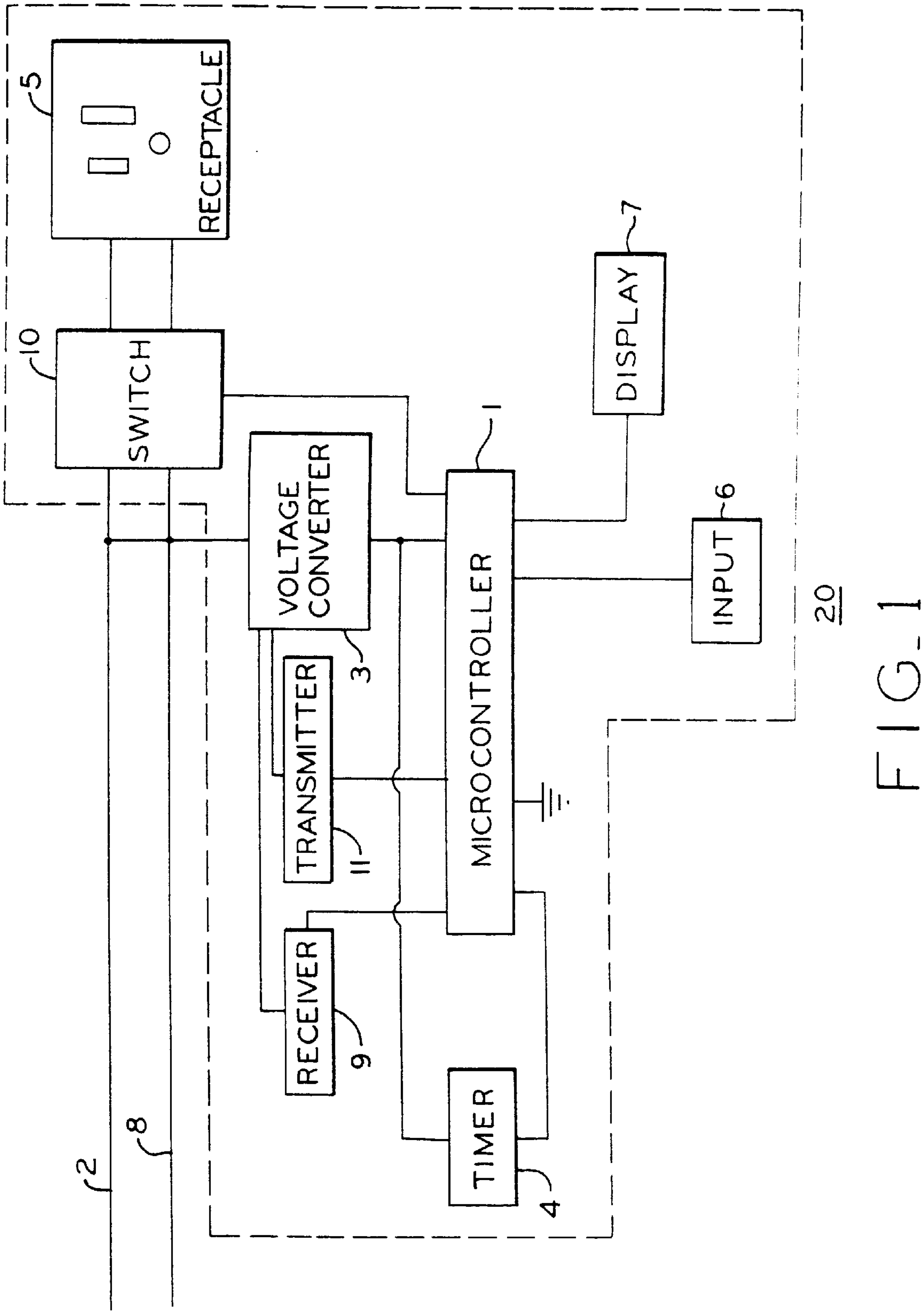
FIG. 1 is an illustrative schematic diagram of a circuit which can be used in the modular timers of the present invention.

The present invention provides electrical timers that can be used to activate and/or deactivate electrical devices such as lights. More particularly, the present invention is directed to modular electrical timers which interact with one another so as to effect random operation of a plurality of electrical devices.

The electrical timers of the present invention are similar to known electrical timers in that they are designed to be hard-wired electrical receptacles, or plugged into standard electrical receptacles or outlets and include receptacles into which electrical devices to be controlled can be coupled or received. Alternatively, devices to be controlled by the electrical timers can be hard-wired thereto. The electrical timers of the present invention differ from the prior art in that they communicate or interact with one another to insure random operation of a plurality of electrical devices at different locations, creating the apparatus that the devices are activated by an occupant rather than a timer.

The basic manner in which the electrical timers of the present invention operate includes an initial automatic step of waking from a sleep state or mode, a step of sensing for a transmitted signal and, depending on the receipt of a transmitted signal, a step of either returning back into the sleep mode, or a step of applying electrical power to an electrical device while simultaneously transmitting a signal for a predetermined time interval. Any number of variations can be encompassed by the basic sequence.

The present invention involves the cooperative use of two or more identical timer units 20. Each modular timer 20 (depicted in FIG. 1) has multiple internal clocks, at least one with a random function which can be set so that the modular timer wakes up within a random time interval surrounding a preset time (set manually by the user). For example, each timer can be set by the user to wake up at preset time, e.g. 8:00 pm, and the random circuit function will cause the timers to actually wake up randomly 15–20 minutes before or after the present time, e.g. 7:40 pm–8:20 pm.

As each modular timer 20 wakes up, the circuitry therein (for example receiver 9) first senses for a transmitted signal that can be identified by microcontroller 1. If a transmitted signal is received and sensed or identified, the modular timer goes back into its sleep mode. In no transmitted signal is received or sensed, the modular timer applies electrical power to an associated electrical device, and begins sending out a transmitted signal.

Any other modular timers 20 which subsequently wake up (within the random timer interval, e.g. 7:40 pm–8:20 pm) will sense the signal transmitted by the first modular timer, and in response thereto will return to their sleep modes. The first modular timer 20 only needs to transmit the signal during the total random time period, e.g. 40 minutes.

The transmitted signal can be carried through a common or neutral line 8 which communicates between receptacles unto which the timers are plugged. The transmitted signal can also be transmitted through a power feed line 2 (at an appropriate frequency according to conventional techniques) or transmitted using both power and neutral lines, or even a ground line (not shown). In the alternative, the signal can be transmitted as an EMF broadcast signal, such as frequency modulation (FM).

The invention allows the use of identical modular timers 20 which can be manually set in a conventional manner, and provides for truly random activation of one of more electrical devices, e.g. lamps, in a residence or business. This can be done with any number of modular timers configured to interact in a variety of different ways.

In further, more complicated embodiments of the present invention, the use of coded transmission signals can effect random operation or activation of two or more groups of electrical devices, e.g. lamps, in a residence or business. For example, the signal sent by the first timer 20 could cause a second timer to wake up in response thereto and send a second coded signal. The second timer could activate an electrical device and the second signal could operate like the first signal and cause subsequent timers to return to their sleep modes. Alternatively, the first signal could merely cause the second timer to send the second signal without activating an electrical device and the second signal could cause a third timer to activate an electrical device and could cause subsequent timers to return to their sleep modes. All of this can be done by simply preprogramming microcontrollers 1.

FIG. 1 is a schematic diagram of a circuit which can be used in the modular timers 20 of the present invention. The modular timers include a microcontroller or microprocessor 1, which controls the operation thereof. The microcontroller or microprocessor 1 receives power from lead line 2 of a standard residential power wiring system. The power which can be a standard 100 volt 60 kHz AC current is converted to an appropriate lower voltage (an DC voltage if desired) by a voltage converter or circuit identified by reference numeral 3. The modular timer 20 can include an internal timer element or circuit 4. The timer element or circuit 4 can be programmed externally in a manual manner to set the "on" and "off" times for the modular timer 20. The timer element 4 can include a random variable function which causes the modular timer 20 to apply power to receptacle 5 randomly within a preset time interval around the manually set "on" time. The time function can also be part of microcontroller 10, and can cause the modular timer 20 to stop or interrupt power to receptacle 5 randomly within a preset time interval around the manually set "off" time. In the alternative, the time at which power is interrupted can be fixed rather than be random. Such timer circuits and functions are known to those skilled in the art.

FIG. 1 depicts a data input elements 6 by which the "on" and "off" times can be set, and a display 7 which can display clock time and verify set "on" and "off" times. The data input element 6 can also be used to set or adjust the correct clock time in a known manner.

When the set "on" time is reached (within the random variable interval, e.g. 15–20 minutes on either side of the set "on" time), the microcontroller or microprocessor 1, detects for the presence of a signal that can be sent through the power system line 8 and/or 2. Receiver element or circuit 9 is used to sense a transmitted signal. If a transmitted signal is received by receiver element or circuit 9 and verified by the microcontroller 1, the microcontroller 1 turns the modular timer circuit 20 off until the next time a set "on" time is reached. Alternative operations encompass the wake up operation being carried out on a periodic basis, every few minutes or even every few seconds during the random durations on either side of the set time.

If a transmitted signal is not received by receiver element circuit 9 (or alternatively not verified by the microcontroller or microprocessor 1), the microcontroller or microprocessor 1 applies voltage to receptacle 5 by operating switch 10, and at the same time, transmits a signal through power system line 8 and/or 2, by operating transmitter 11. As discussed above, the transmitted signal is transmitted over the total random time interval over which the timer circuit 4 randomly activates the wake-up operation of the modular timers 20 (e.g. 30–40 minutes in the present example).

The modular timers 20 can include male electrical connectors (not shown) which are sized and dimensioned to be received in a conventional wall electrical receptacle or extension cord. The modular timers also include female electrical connectors (receptacle 5 in FIG. 1) into which an electrical device, such as lamp, to be controlled can be plugged. Switch 10 is preferable part of the receptacle 5 although this is not required for operation of the present invention. The modular timers can be housed in a housing of conventional design, similar to known, plug-in electrical timers. If desired, the modular timers (and their electrical circuits) can have manual switches which over-ride the automatic control.

In alternative embodiments, the transmitted and received "control" signal can be sent through the lead 2 and/or 8, a common ground (not shown), or transmitted in a wireless manner using EMF signals such as FM or infrared (IR). It is also possible to used a plurality of coded control signals to effect random operation or activation of two or more electrical devices as discussed above.

One of the advantages of the modular timers 20 of the present invention is that a consumer need only purchase two or more identical timers. Another advantage is that, in order to operate the modular timers, the consumer need only set "on" and "off" times in a conventional manner. Another advantage is that the two or more modular timers will operate in a cooperative manner to randomly activate different electrical devices, such as lamps, in a residence or business building. Such random activation of lamps will give the appearance that the residence or building is occupied by someone who is varying locations therein.

Figure 2:
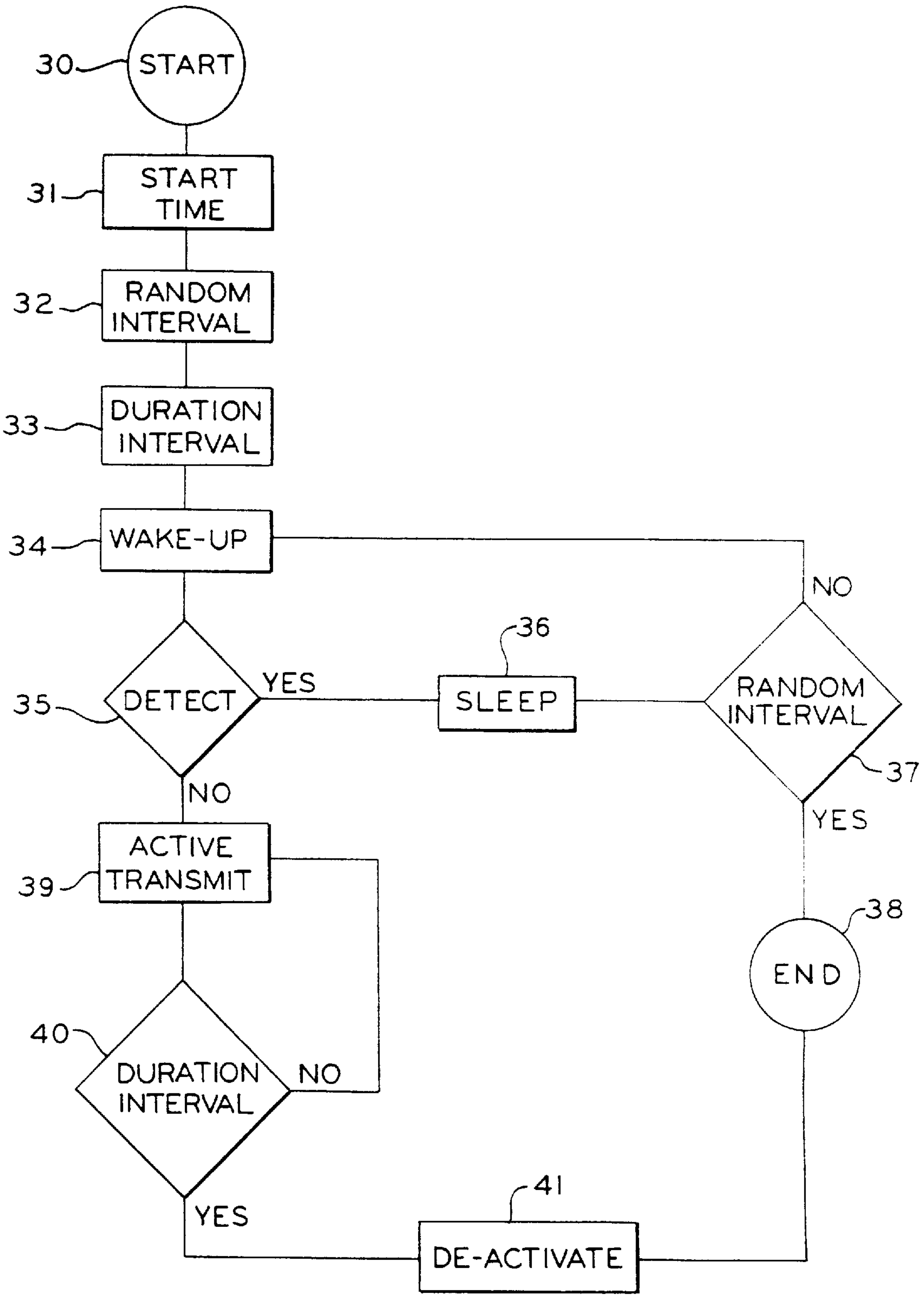
FIG. 2 is an exemplary flow diagram depicting operation of one embodiment of the present invention.

The simplest version of the preferred embodiment uses two identical timing devices or modular timers 20. The operation of this embodiment is depicted by the flow chart of FIG. 2. FIG. 2 applies to the first modular timer 20 that is activated based upon random operation of the "wake-up" function. In principal, both modular timers 20 are set to operate at the same preselected time. However, there is a random interval both proceeding and subsequent to the set time. This random interval, as previously described, and be between 1 and 20 minutes or longer both before and after the start time. Microcontroller 1 has a random operation function that will wake-up the modular timer 20 an a random basis. Consequently, each modular timer 20 will carry out it's wake up function at a different time depending upon the random function controlling the "wake-up" time, based upon the preselected start time.

The start timer is set at step 31. This operation is carried out manually by the user and should be applied for all modular timers 20 to be used in conjunction with each other. Preferable, timer 4 is manually adjusted by the user. The function of timer 4 can be contained within microcontroller 1. In either case, a manual input device 6 will have to be used. It should be noted that the start time does not have to be exactly the same for both modular timers 20 since there is a great deal of latitude provided by the random intervals on either side of the start time. However, the time period over which the first-to-turn-on timer sends a control signal will be long enough to be received by every timer which subsequently wakes up and senses for a control signal.

At step 32, the user can set the random intervals unless they are factory set according to one embodiment. This should be the same for both modular timers 20. However, a more complex operating arrangement may admit to different random intervals for the two modular timers.

The duration interval is also manually set at step 33. This interval is the entire time that the switch 10 and the modular timers 20 will be closed in order to activate receptacle 5. This duration interval is also preferable set at the same duration for both modular timers 20. However, in a more complex arrangement, each timer 20 may have a different duration interval during which receptacle 5 is activated. It should be noted that the duration interval may be set automatically as a function of the timer or the microcontroller 4, and may not be susceptible to adjustment by the user unless additional measures are taken on the part of the user to adjust the duration interval. All of the aforementioned manual adjustments are made using input device 6 as previously discussed. Extraordinary functionality, such as the adjustment of the duration interval, can also be carrier out through the use of additional input operations using input device 6.

The wake up operation 34 is carried out based upon the random selection of a time within the random interval at which the modular timer 20 is activated. Because of the random operation in selecting a particular time within the random interval (on either side of the user-selected start time), it is impossible to predict when a particular modular timer 20 will carry out the wake up operation, which is necessary to begin the operation necessary to activate switch 10 and allow an appliance connected to receptacle 5 to be activated for a particular modular timer 20. This is true even when two or more identical modular timers 20 are used in a particular arrangement. However, in other embodiments and variations, the wake up sequence can be altered by the user so as to favor first activation by a selected modular timer 20. The wake up activation provides increased power to operate parts of the circuitry that allow other, subsequent operations to be carried out.

The first part of the wake up operations is step 35, in detecting for a particular signal. This signal is preferable carried on power line 2 and/or 8, being routed by voltage converter 3 and conveyed to receiver 9. If a signal is detected, or a particular one of a number of signals (as used in more complex embodiments), the modular timer 20 immediately returns to the sleep state. This is indicated at step 36.

In the simplest embodiment only one attempt to wake and activate a timer is made during the random interval. In the alternative, during the sleep state, a timer 4, or a timing function in microcontroller 1 may operate to wake up the modular timer 20 after a predetermined period, usually a few second. However, the wake up operation can occur only within the random interval. Accordingly, a decision is made at step 37 to determine if the random interval has expired. If this has occurred, the sequence is ended, as indicated at step 38. If, on the other hand, a random interval has not yet expired, the wake-up operation is reinitiated at step 34. It should be noted that the interval for repeating the wake-up operation at step 34 is preferably adjusted at the factory for a reasonable duration, such as five seconds. However, microcontroller 1 can be adjusted using input device 6 so that a user can adjust the interval during which the wake-up operation will be repeated with the random interval.

Normally, the predetermined signal detected (which sends the modular timer 20 back into the sleep state at step 36), is sent by an identical timer which has carried out its wake up function pervious to that of the first modular timer 20. Once a modular timer carries out the wake up function and operates to detect an incoming signal, a decision is made. If a signal is detected, the modular timer goes back to the sleep state. If, on the other hand, no signal is detected, the modular timer will activate and transmit its own signal (from transmitter 11 via power line 2 and/or 8). This signal will serve to cause subsequently activated modular timers to return to their sleep states.

At step 39, the modular timer 20 will also activate switch 10 so that receptacle 5 receives power. As a result, any connected electrical appliance, such as a lamp, will be activated. The receptacle 5 will continue in a powered state until the overall duration interval expires. As indicated at step 40, if the duration interval has not been completed, the receptacle 5 continues to remain in under power. If, on the other hand, the duration interval has been reached, receptacle 5 is deactivated at step 41 and the process ends as indicated at step 38.

While the aforementioned embodiment is carried out with two identical modular timers 20, other variations are possible within the concept of the present invention. For example, more than two identical timers can be used. In such a case, three or more modular timers would be set at the same start time and a first timer would be activated, depending upon the random selection within the random interval. Consequently, the first modular timer selected for the predetermined duration interval (during which a receptacle could be activated) would most likely be different each time since the selection would be based upon a random wake up time within the random interval). Virtually any number of modular timers could be used, with one timer randomly being selected to activate first and lock out all of the other modular timers by virtue of transmitting the signal that would cause the other timers to go back into their sleep modes.

Because of the flexibility of the microcontroller 1, it is possible to adjust the random interval (approximately 15–20 minutes previous and subsequent to the set time) as well as the duration interval (the time during which a receptacle controlled by a modular timer can be activated). For example, the time during which the modular timer might wake-up can be set for the entire duration interval rather than the random interval. As a result, a first timer can carry out its entire duration interval during which its appliance is activated, and then a subsequent random activation of other modular timers can take place. This would allow a sequence of random activations throughout a residence over a selected portion of an evening, or even throughout the entire night.

In still another variation, groups of modular timers 20 can be arranged to activate only by signaling from other selected modular timers with the same group. Other modular timers designated as being outside of the group would not be affected by the signals sent out by the modular timers in the first group. This could be accomplished by coded signals which are sent and responded to only by the modular timers in a particular group. Modular timers in other groups do not react to such signal, and so would not be forced back into the sleep mode. Adjusting a microcontroller 1 to provide coded signals for transmission is an operation easily carried out by one skilled in this art, and needs no further elaboration for purposes of the present invention. By using coded signals specific to only a particular group of modular timers 20, a plurality of different modular timer groups can be employed within a building to carry out virtually any sequence of appliance activation conceivable to the user. Each group of modular timers can be set to interact only with other timers in a selected group, allowing different sequences of operation for different groups of modular timers.

By using separate groups, each with identical modular timers, any number of complex activation sequences can be easily carried out. Conventionally, this is only possible through the use of complex controllers using master-slave arrangement between a control station and a plurality of slave units that are controlled through a central processor. Such an arrangement requires a relatively complex and tedious preprogramming operation. Further, the added expense of the master controller very often inhibits the use of such devices. In contrast, the present invention allows virtually any level of complexity without the disadvantages of conventional systems.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention is ste forth in the following claims.

What is claimed is:

1. A timer module arranged to create an appearance of random activation of a least one selected electrical device, said timer module being arranged to select from a plurality of activation times and to respond to an identification signal from a similar timer module, said timer module comprising:

(a) a power switch arranged to activate at least one said selected electrical device;

(b) a random selection device arranged to select at random, a point in a preselected time interval on either side of a selected activation time;

(c) a receiver arranged to detect for said identification signal;

(d) a transmitter arranged to send said identification signal; and, (e) a controller programmed to deactivate said timer module upon receipt of said identification signal, and to activate said power switch and said transmitter when said identification signal is not received.

2. The timer module of claim 1, wherein said preset time interval is about 10–20 minutes on either side said activation time.

3. The timer module of claim 1, wherein said controller is further programmed to determine an activation interval during which said power switch is capable of activating said selected electrical device.

4. The timer module of claim 1, wherein said transmitter conveys said identification signal over internal power lines of a structure in which said timer module is installed.

5. The timer module of claim 1, wherein said identification signal is conveyed using radio frequencies.

6. The timer module of claim 1, wherein said identification signal is conveyed using infrared radiation.

7. The timer module of claim 1, wherein said receiver detects for said identification only during said random time interval.

8. The timer module of claim 1, wherein said receiver detects for said identification signal for the entirety of said activation interval.

9. The timer module of claim 1, wherein said transmitter sends out said identification signal over said preselected time interval when activated.

10. The timer module of claim 2, wherein said transmitter sends out said identification signal over said preselected time interval when activated.

* * * * *